US009696002B2

(12) United States Patent
Ohashi et al.

(10) Patent No.: US 9,696,002 B2
(45) Date of Patent: Jul. 4, 2017

(54) TAIL LIGHT DEVICE FOR VEHICLE

(71) Applicant: HONDA MOTOR CO., LTD., Tokyo (JP)

(72) Inventors: Hayato Ohashi, Wako (JP); Ryuhei Soeta, Wako (JP); Eikichi Momma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 14/242,330

(22) Filed: Apr. 1, 2014

(65) Prior Publication Data

US 2014/0321149 A1     Oct. 30, 2014

(30) Foreign Application Priority Data

Apr. 24, 2013   (JP) .................................. 2013-091639

(51) Int. Cl.
| | |
|---|---|
| *F21V 7/00* | (2006.01) |
| *F21V 29/00* | (2015.01) |
| *B60Q 1/26* | (2006.01) |
| *F21S 8/10* | (2006.01) |
| *F21V 21/00* | (2006.01) |

(Continued)

(52) U.S. Cl.
CPC ............ *F21S 48/23* (2013.01); *B60Q 1/0041* (2013.01); *B60Q 1/2607* (2013.01); *B62J 6/005* (2013.01); *B62J 6/04* (2013.01); *F21S 48/211* (2013.01); *F21S 48/215* (2013.01); *F21S 48/218* (2013.01); *F21S 48/2206* (2013.01);

(Continued)

(58) Field of Classification Search
CPC .. B60Q 1/2607; B60Q 1/0041; B60Q 1/0058; B62J 6/04; B62J 6/005; F21S 48/234; F21S 48/238; F21S 48/232; F21S 48/23
See application file for complete search history.

(56) References Cited

U.S. PATENT DOCUMENTS 1,732,165 A  *  10/1929  Kelly ........................ B60Q 1/34
                                                                362/240
1,959,248 A  *  5/1934   Molnar ................. F21S 48/145
                                                                362/355

(Continued)

FOREIGN PATENT DOCUMENTS

| DE | 10 2007 033 711 A1 | 1/2009 |
|---|---|---|
| DE | 10 2010 043 921 A1 | 5/2012 |

(Continued)

*Primary Examiner* — Renee Chavez
*Assistant Examiner* — Erin Kryukova
(74) *Attorney, Agent, or Firm* — Westerman, Hattori, Daniels & Adrian, LLP (57) ABSTRACT

A tail light device for a vehicle is provided in which a stop lamp, blinkers and a tail lamp are arranged in a common housing. The device allows for reducing component parts and making the device smaller. There are provided a stop lamp reflector for reflecting light through an inner surface thereof from a light source for a stop lamp, and a blinker reflector for reflecting light through an inner surface thereof from a light source for a blinker. The stop lamp reflector and the blinker reflector are attached to the housing in such a way as to be spaced apart from each other. Tail lamp reflection surfaces for reflecting light from the light source for the tail lamp, are formed on outer surfaces of the stop lamp reflector and the blinker reflector.

11 Claims, 6 Drawing Sheets

(51) Int. Cl.
  *F21V 1/00* (2006.01)
  *F21V 11/00* (2015.01)
  *B60Q 1/00* (2006.01)
  *B62J 6/04* (2006.01)
  *B62J 6/00* (2006.01)

(52) U.S. Cl.
  CPC ....... *F21S 48/2212* (2013.01); *F21S 48/2218* (2013.01); *F21S 48/232* (2013.01); *F21S 48/238* (2013.01)

(56) References Cited

U.S. PATENT DOCUMENTS

| | | | | |
|---|---|---|---|---|
| 4,774,637 A | * | 9/1988 | Budde | H01R 4/2429 362/227 |
| 4,812,955 A | * | 3/1989 | Beswick | B60Q 1/2607 362/240 |
| 5,084,805 A | * | 1/1992 | Goto | F21S 48/2218 362/510 |
| 5,140,504 A | * | 8/1992 | Sato | B60Q 1/0041 362/263 |
| 5,519,588 A | * | 5/1996 | Sobeck | B60Q 1/2607 362/240 |
| 5,552,969 A | * | 9/1996 | Murakami | B60Q 1/2607 362/243 |
| 5,566,057 A | * | 10/1996 | Iwami | B60Q 1/0041 362/509 |
| 6,024,474 A | * | 2/2000 | Tanaka | B60Q 1/2607 362/249.01 |
| 6,290,371 B1 | * | 9/2001 | Feger | B60Q 1/2607 362/217.05 |
| 6,296,382 B1 | * | 10/2001 | Hamelbeck | B60Q 1/2607 362/235 |
| 6,327,095 B1 | * | 12/2001 | Tamai | B29D 11/00 264/1.1 |
| 6,469,622 B1 | * | 10/2002 | Komatsu | B60Q 1/2607 340/463 |
| 2002/0057578 A1 | * | 5/2002 | Kageyama | B29C 66/131 362/544 |
| 2002/0139596 A1 | * | 10/2002 | Yagisawa | B60Q 1/2607 180/219 |
| 2003/0227781 A1 | | 12/2003 | Mochizuki | |
| 2004/0165411 A1 | * | 8/2004 | Heath | B60Q 1/0041 365/110 |
| 2006/0256572 A1 | | 11/2006 | Lin | |
| 2007/0081353 A1 | * | 4/2007 | Gutjahr | B60Q 1/2607 362/509 |
| 2010/0290243 A1 | | 11/2010 | Janssen | |
| 2011/0280034 A1 | * | 11/2011 | Tsukamoto | F21S 48/211 362/544 |
| 2013/0235582 A1 | | 9/2013 | Breidenassel et al. | |

FOREIGN PATENT DOCUMENTS

| | | |
|---|---|---|
| EP | 2 394 891 A2 | 12/2011 |
| JP | 11-321447 A | 11/1999 |
| JP | 2007-203828 A | 8/2007 |

* cited by examiner

TAIL LIGHT DEVICE FOR VEHICLE

CROSS-REFERENCE TO RELATED APPLICATIONS

The present application claims priority under 35 U.S.C. §119 to Japanese Patent Application No. 2013-091639, filed Apr. 24, 2013, the contents of which is incorporated herein, by reference, in its entirety.

TECHNICAL FIELD

The present invention relates to a tail light device for a vehicle in which a stop lamp, blinkers and a tail lamp are arranged in a common housing.

BACKGROUND OF THE INVENTION

The tail light device is disclosed in Japanese Patent Laid-open Publication No. 2007-203828.

SUMMARY OF THE INVENTION

In the device disclosed in Japanese Patent Laid-open Publication No. 2007-203828, a way to make the tail light device smaller is explained. However, the stop lamp, the blinkers and the tail lamp have separate reflectors, respectively, so that the number of component parts is increased, and there is room for further downsizing.

A tail light device for a vehicle is herein provided that is capable of reducing component parts and making the device still smaller.

According to a first feature, there is provided a tail light device for a vehicle in which a stop lamp, blinkers and a tail lamp are arranged in a common housing, comprising a stop lamp reflector for reflecting light through an inner surface thereof from a light source for the stop lamp, and a blinker reflector for reflecting light through an inner surface thereof from a light source for each of the blinkers, wherein the stop lamp reflector and the blinker reflector are attached to the housing separately from each other, a light source for the tail lamp being located between the stop lamp reflector and the blinker reflector, and tail lamp reflection surfaces for reflecting light from the light source for the tail lamp, being formed on outer surfaces of the stop lamp reflector and the blinker reflector.

According to a second feature, in addition to the first feature, at least a portion, which faces the light source for the tail lamp, of each of the outer surfaces of the stop lamp reflector and the blinker reflector, is formed in a flat shape extending in parallel with an optical axis of the light source for the tail lamp.

According to a third feature, in addition to the second feature, the stop lamp reflector and the blinker reflector are each arranged each on near sides to the light source for the stop lamp and the light source for each blinker, which are provided to correspond individually to the reflectors, wherein each of the stop lamp reflector and the blinker reflector has concave surface portions which are configured to reflect light rearwardly from the light source and a pair of lateral wall portions extending rearwardly in an irradiating direction from the concave surface portions, and the light source for the tail lamp is located forwardly of a boundary facing the light source of the tail lamp, among boundaries between the concave surface portions and the lateral wall portions.

According to a fourth feature, in addition to the second or third feature, an inner lens for the tail lamp made of frosted glass is arranged to the rear of the light source for the tail lamp.

According to the first feature, since the tail lamp reflection surface for reflecting the light from the light source for the tail lamp is formed on outer surfaces of the stop lamp reflector and the blinker reflector, the reflector for the tail lamp use only is not necessary. Thus, the number of component parts can be reduced and the tail light device can be made smaller in size.

According to the second feature, since each of the outer surfaces of the stop lamp reflector and the blinker reflector has at least the portion which faces the light source for the tail lamp and which is formed in a flat shape extending in parallel with the optical axis of the light source for the tail lamp, the tail lamp reflection surface also extends in parallel with the optical axis of the light source for the tail lamp. Thus, the light from the light source for the tail lamp can be more easily irradiated to the rear side.

According to the third feature, each of the stop lamp reflector and the blinker reflector has the concave surface portions which are configured to reflect the light rearwardly from the light source and the pair of lateral wall portions extending rearwardly in the irradiating direction from the concave surface portions, and the light source for the tail lamp is located forwardly of the boundary facing the light source of the tail light, among boundaries between the concave surface portions and the lateral wall portions. With this construction, the light source for the tail lamp is arranged in a comparatively large space around the concave surface portions, so that the degree of freedom with respect to the arrangement of the light source for the tail lamp can be increased.

Further, according to the fourth feature, since the inner lens for the tail lamp arranged to the rear of the light source for the tail lamp is made of frosted glass, the tail lamp, in cooperation with the reflecting light from the tail lamp reflection surfaces of flat shape formed on outer surfaces of the stop lamp reflector and the blinker reflector, can easily cause surface light emission.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present invention will be explained with reference to the attached drawings. In the following description, the orientation such as "front", "rear", "left", "right", "upper" and "lower" is indicated with reference to a driver riding on a two-wheeled motorcycle.

Figure 1:
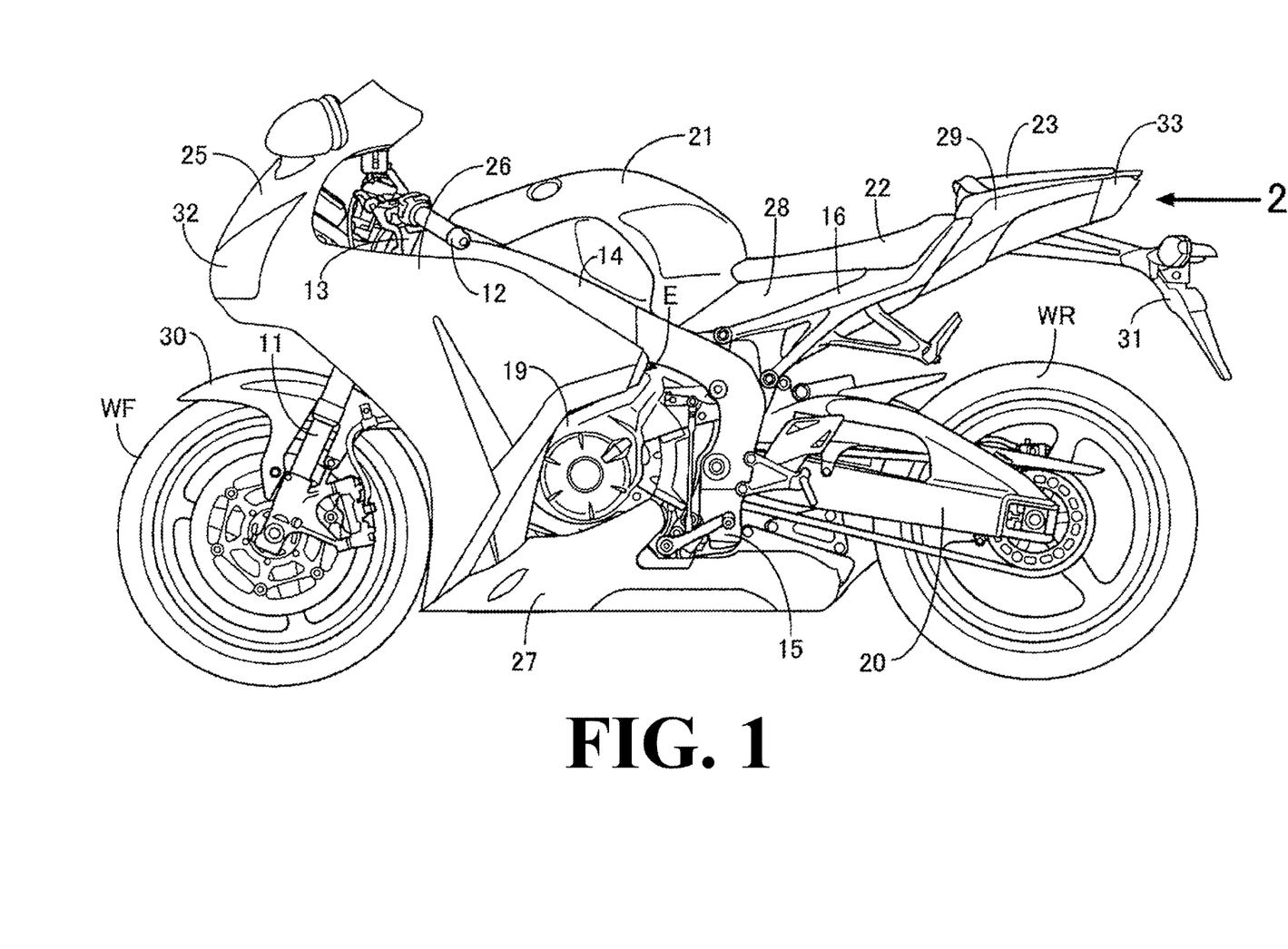
FIG. 1 is a side view of a two-wheeled motorcycle.

An embodiment of the present invention will be explained with reference to the attached drawings. Referring first to FIG. 1, a vehicle body frame F of a two-wheeled motorcycle of a straddle type vehicle includes a pair of front forks 11 pivotally carrying a front wheel WF, a head pipe 13 supporting a steering handle 12 in a steerable fashion which is connected to the front forks 11, a pair of left and right main frames 14 extending from the head pipe 13 downwardly to the rear, a pair of left and right pivot frames 15 being connected integral with rear portions of the main frames 14 and extending downwardly, a pair of left and right seat rails 16 extending from the rear portions of the main frames 14 upwardly to the rear, etc.

On the vehicle body frame F, there is carried an engine body 19 of, for example, a water cooled internal combustion engine E which is arranged under the main frames 14. In addition, a swing arm 20 is pivotally mounted at a front end thereof on the pivot frames 15 in an upwardly and downwardly swingable fashion. A rear wheel WR which is driven by motive power of the internal combustion engine E is pivotally carried on a rear end of the swing arm 20.

A fuel tank 21 is mounted on the main frames 14 above the internal combustion engine E. A front riding seat 23 which is disposed in the rear of the fuel tank 21 and a rear riding seat 23 which is disposed in the rear of the front riding seat 22 are supported by the seat rails 16.

A front cowling 25 is located directly above the front wheel WF and supported by the vehicle body frame F. The head pipe 13 located in a front end portion of the vehicle body frame F is covered with the front cowling 25 from the forward direction. A pair of left and right center cowlings 26 for covering the front portion of the vehicle body frame F and a portion of the internal combustion engine E from each of lateral directions are connected to left and right sides of the front cowling 25. A pair of left and right lower cowlings 27 which cover a lower part of the internal combustion engine E from the lateral sides and the lower side thereof and which are joined to each other are connected continuously to rear lower portions of the center cowlings 26, respectively. In addition, a pair of left and right side covers 28 for covering a rear lower part of the fuel tank 21 from each lateral side are arranged between the fuel tank 21 and the front riding seat 22. A part of each of the seat rails 16 located below the rear riding seat 23 is covered with a rear cowling 29.

Moreover, on the front forks 11 there is supported a front fender 30 for covering at least a portion of the front wheel WF from above, while on the rear of the seat rails 16 there is supported a rear fender 31 for covering the rear wheel WR from a rear upper side.

A head light device 32 is arranged in a front center position of the front cowling 26, while a tail light device 33 in accordance with the present invention is arranged in a center position of a rear end of the rear cowling 29.

Figure 2:
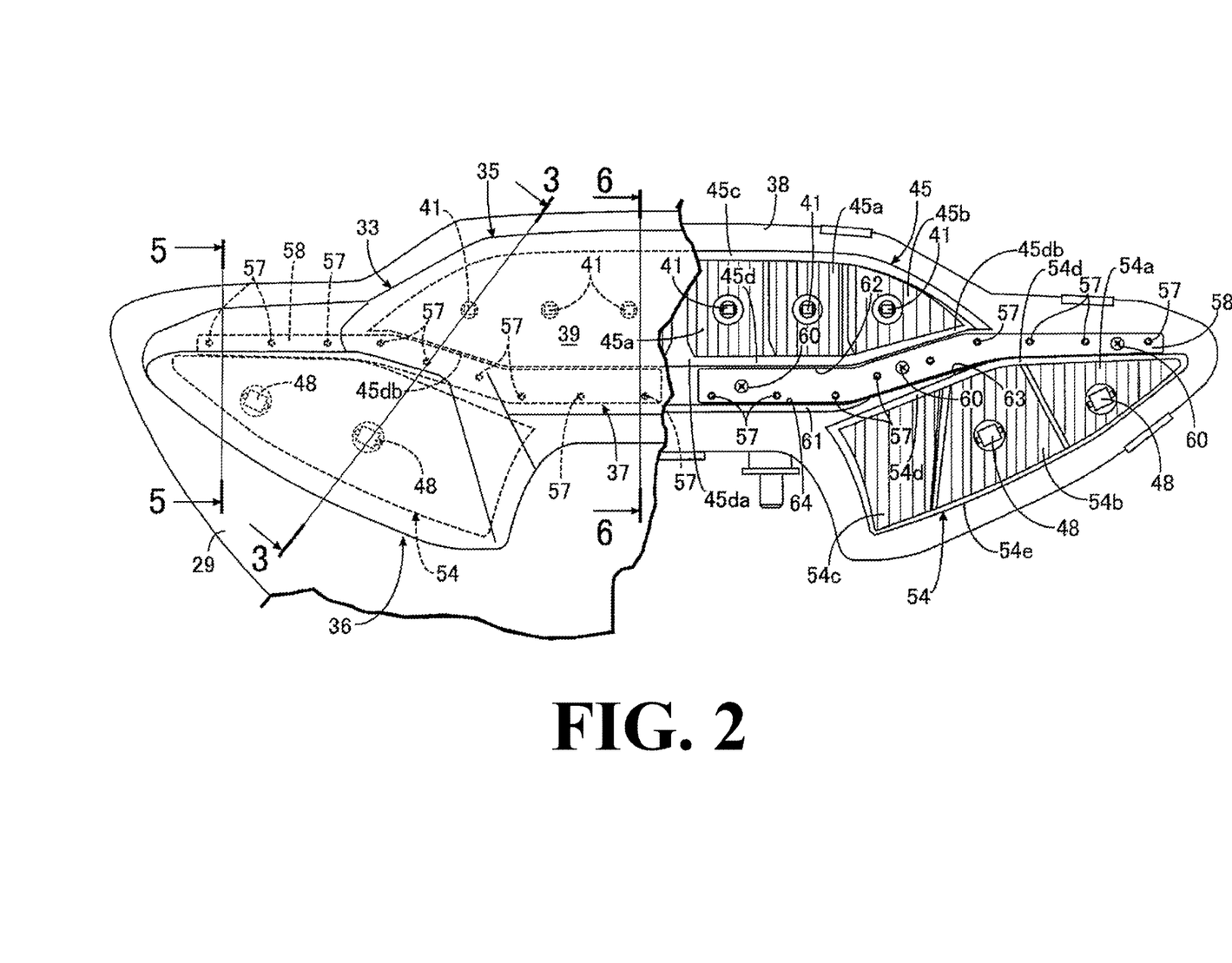
FIG. 2 is a partially cutaway front view of a tail light device taken in the direction of an arrow 2 of FIG. 1.
Figure 3:
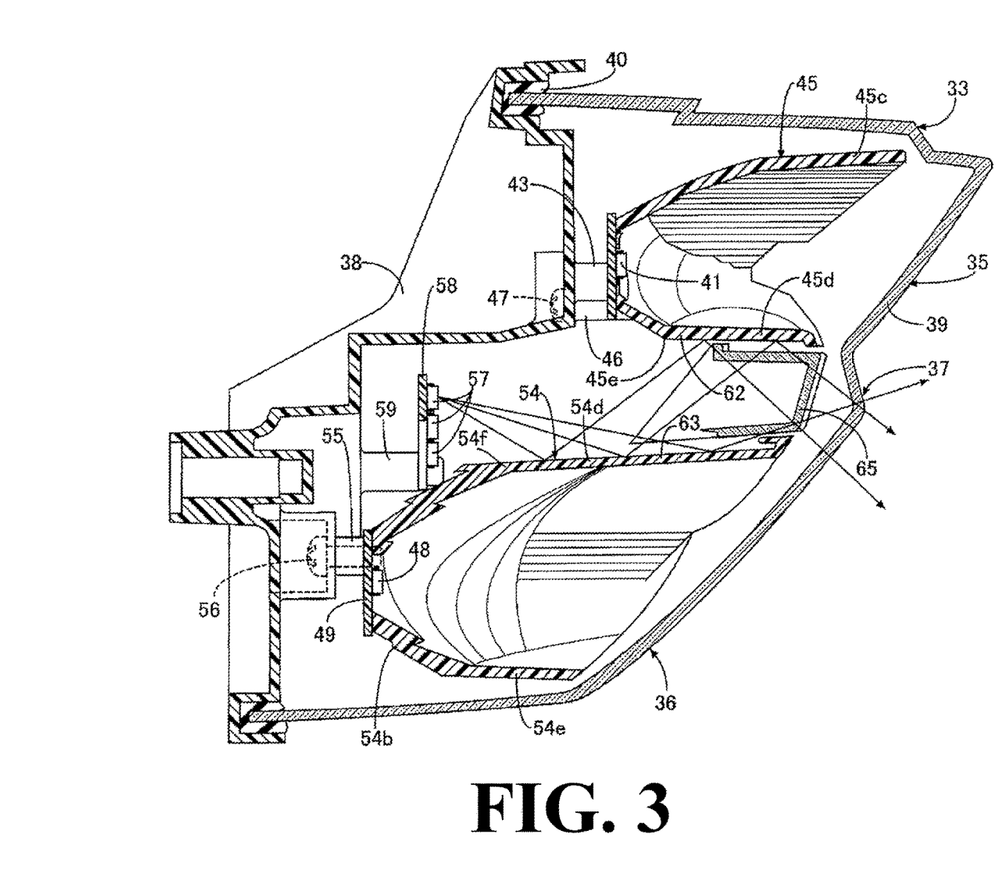
FIG. 3 is a cross sectional view taken on line 3-3 of FIG. 2.

Referring to FIGS. 2 and 3 together, the tail light device 33 has a common housing 38 of synthetic resin in which are arranged a stop lamp 35, a pair of left and right blinkers 36 and a tail lamp 37. To the housing 38 supported on the rear ends of the seat rails 16, there is attached through a seal member 40 a colorless, hyaline outer lens 39 which is commonly used for the stop lamp 35, the blinkers 36 and the tail lamp 37.

Figure 4:
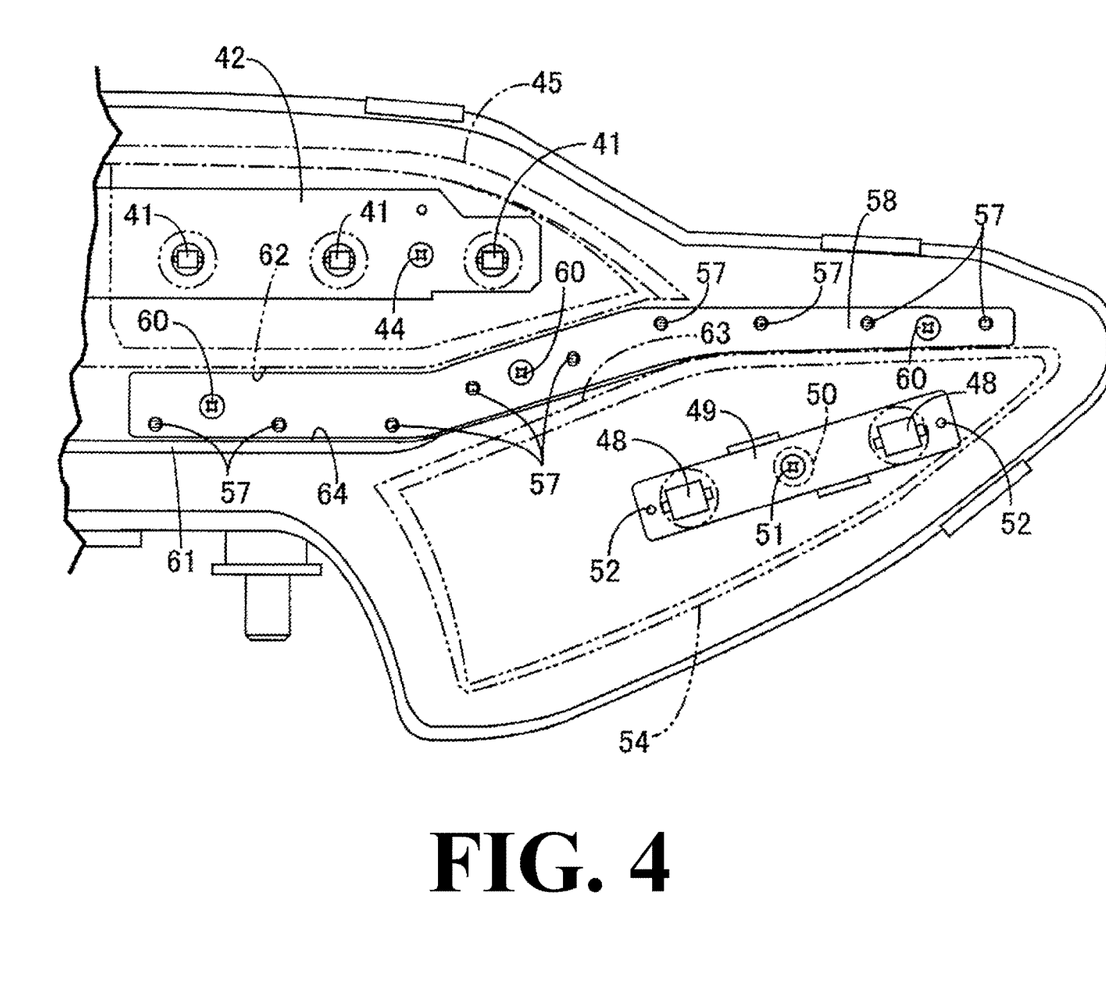
FIG. 4 is a front view showing a right half of the tail light device in the condition where an outer lens, a stop lamp reflector, a blinker reflector and an inner lens are taken off.

Referring to FIG. 4 together, in the outer lens 39, a plurality of, for example, six light sources 41 for the stop lamp 35 are arranged at equally spaced intervals in the vehicle width direction in a state of being covered by the outer lens 39. Each of the light sources 41 for the stop lamp 35 is made of an LED in this embodiment and mounted on a first substrate 42 which extends long in the vehicle width direction. This first substrate 42 is fastened by screw members 44 to a plurality of first boss portions 43 provided on the housing 38.

The stop lamp 35 is composed of the outer lens 39, the six light sources 41 for the stop lamp 35, and a stop lamp reflector 45 which reflects through an inner surface thereof light from the light sources 41 for the stop lamp 35. The stop lamp reflector 45 is configured to extend in the vehicle width direction, at a center upper position of the housing 38. A plurality of first fitting projections 46 which are integrally provided on the stop lamp reflector 45 are fastened to the housing 38 with screw means 47 respectively.

The stop lamp reflector 45 is formed of four concave surface portions 45a being arranged side by side in the vehicle width direction, two concave surface portions 45b being arranged outwardly of the concave surface portions 45a in the vehicle width direction, and a pair of first (upper) and second (lower) lateral wall portions 45c, 45d extending rearwardly in an irradiating direction from the concave surface portions 45a, 45b. The plurality of concave surface portions 45a, 45b correspond individually to the six light sources 41 for the stop lamp 35 and are arranged in the vicinity of each of the corresponding light sources 41 such that they reflect rearwardly the light from the light sources 41 for the stop lamp 35. The concave surface portions 45a, 45b are formed, for example, in paraboloid and ellipsoid shapes, placing the focus on the light sources 41 for the stop lamp 35. Alternatively, the concave surface portions 45a and 45b can be formed in a multi-reflection shape which has a plurality of reflecting surfaces facing a plurality of different directions and which approximates the paraboloid and the ellipsoid.

Both end portions in the vehicle width direction of the first and second lateral wall portions 45c, 45d are inclined in such a manner as to gradually come nearer to each other as they extend outwardly in the vehicle width direction. Among the four concave surface portions 45a and the two concave portions 45b, the concave surface portions 45b, located in both ends in the vehicle width direction, gradually become smaller in height in the upward and downward direction as they go outwardly in the vehicle width direction, in a front view.

Below both left and right sides of the stop lamp 35, each pair of light sources 48 for the blinkers 36 covered with the outer lens 39 are arranged side by side at spaced intervals in the vehicle width direction. Each of the light sources 48 for the blinkers 36 is formed of an LED in this embodiment. The light sources 48 for the blinkers 36 are arranged in pairs on each of second substrates 49, which are separately arranged left and right in a pair. One second boss portion 50 for each of the second substrates 49 is provided in the housing 38, and a substantially center portion of the second substrate 49 is fastened to the second boss portion 50 by a screw member 51. Positioning pins 52, 52 provided in the housing 38 are inserted into both end portions in the longitudinal direction of the second substrate 49.

The blinker 36 is composed of the outer lens 39, the two light sources 48 for the blinker 36 and a blinker reflector 54 for reflecting through an inner surface thereof the light from the light sources 48 for the blinkers 36. The blinker reflectors 54 for the pair of left and right blinkers 36 are arranged under and spaced apart from both left and right sides of the stop lamp reflector 45, respectively. In addition, a plurality of second fitting projections 55 provided integrally with the blinker reflector 54 are fastened each to the housing 38 by screw members 56.

The blinker reflector 54 includes three concave surface portions 54a, 54b, 54c which are located in the vicinity of the two light sources 48 for the blinker 36 and arranged side by side in the vehicle direction, and a pair of third (upper) and fourth (lower) lateral wall portions 54d, 54e extending rearwardly in an irradiating direction from the concave surface portions 54a, 54b. The light sources 48 for the blinkers 36 are arranged in the center concave surface portion 54b and the outer end concave surface portion 54a in the vehicle width direction, among the three concave surface portions 54a, 54b, 54c arranged side by side in the vehicle width direction.

The concave surface portions 54a, 54b correspond individually to the light sources 48 for the blinkers 36 and are arranged in the vicinity of these corresponding light sources 48 such that they reflect rearwardly the light from the light sources 48 for the blinkers 36. The concave surface portions 54a, 54b are formed, for example, in the shape of paraboloid and ellipsoid shape placing the focus on the light sources 48 for the blinker 36. Alternatively, the concave surface portions 54a, 54b are formed in a multi-reflection shape which has a plurality of reflecting surfaces facing a plurality of different directions and which approximates the paraboloid and the ellipsoid. In addition, the concave surface portion 54c located on the inner end position in the vehicle width direction does not reflect the light from the light source 48 but is formed in the shape corresponding to the concave surface portions 54a, 54b.

Both end portions in the vehicle width direction of the third and fourth lateral wall portions 54d, 54e are formed in such a manner as to gradually come nearer to each other as they extend outwardly in the vehicle width direction. Among the three concave surface portions 54a, 54b, 54c, the concave surface portion 54a located in the outer end position in the vehicle width direction gradually becomes smaller in height in the upward and downward direction as they go outwardly in the vehicle width direction in a front view.

Figure 5:
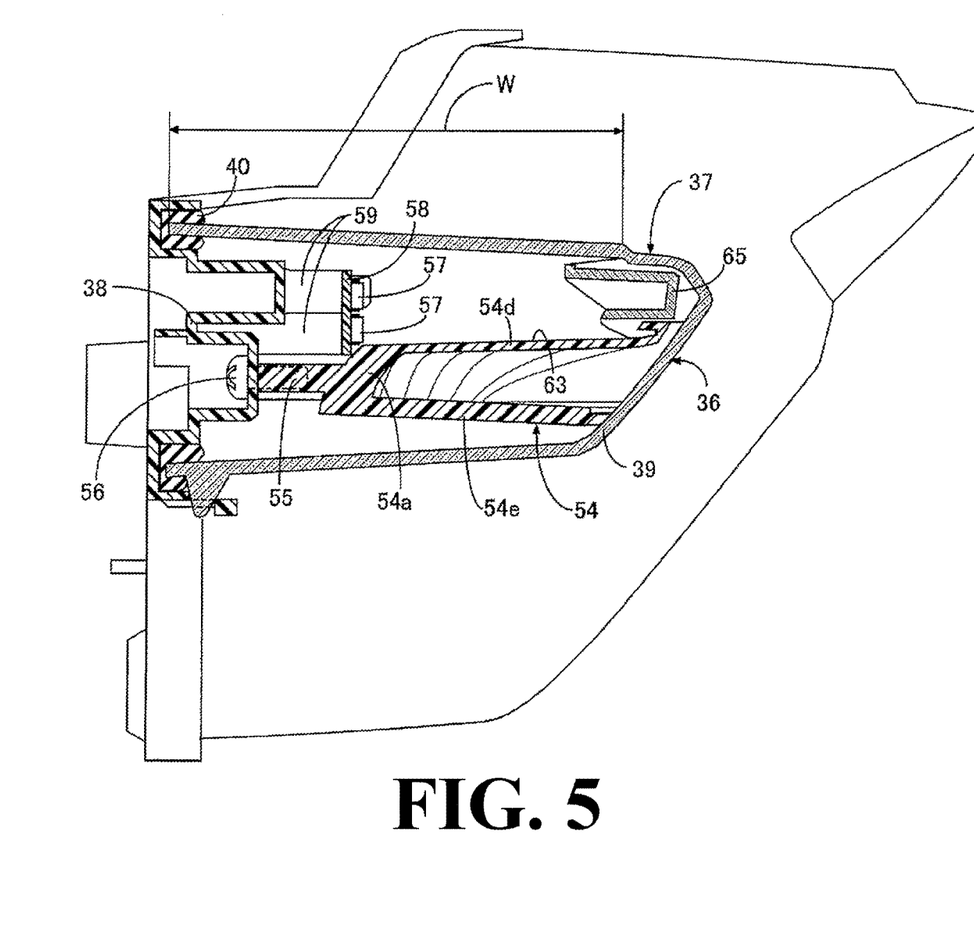
FIG. 5 is a cross sectional view taken on line 5-5 of FIG. 2.
Figure 6:
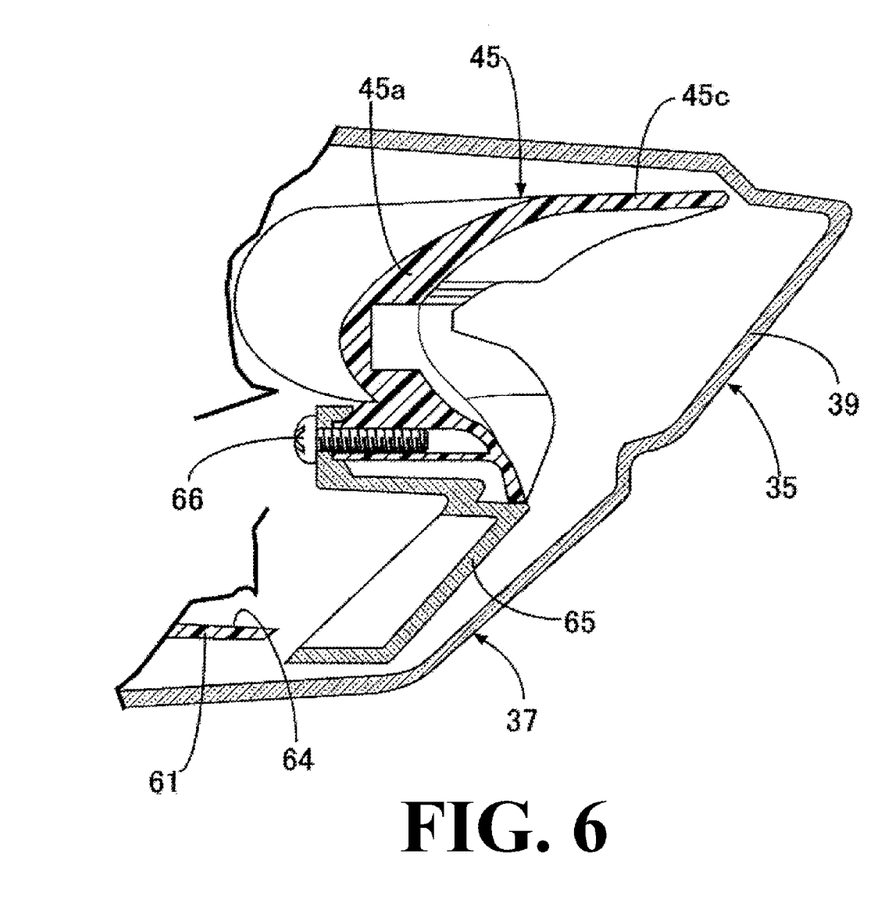
FIG. 6 is a cross sectional view taken on line 6-6 of FIG. 2.

Referring to FIGS. 5 and 6 together, between the stop lamp reflector 45 and the pair of left and right blinker reflectors 54 arranged at spaced intervals below the left and right sides of the stop lamp reflector 45, a plurality of, for example, eighteen light sources 57 for the tail lamp 37 are arranged side by side at spaced intervals in the vehicle width direction. Each of the light sources 57 for the tail lamp 37 is formed of an LED in this embodiment.

The light sources 57 for the tail lamp 37 are arranged forwardly of a boundary 45e facing the light sources 57 for the tail lamp 37, among boundaries between the concave surface portions 45a, 45b of the stop lamp reflector 45 and the pair of first and second lateral wall portions 45c, 45d thereof, and also arranged forwardly of a boundary 54f facing the light sources 57 for the tail lamp 37, among boundaries between the concave surface portions 54a, 54b, 54c of the blinker reflector 54 and the pair of third and fourth lateral wall portions 54d, 54e thereof. In this embodiment, the light sources 57 for the tail lamp 37 are located in front of the stop lamp reflector 45 and also in front of the boundary 54f between the concave surface portions 54a, 54b, 54c of the blinker reflector 54 and the third lateral wall portion 54d thereof.

Between the left and right sides of the stop lamp reflector 45 and the pair of left and right blinker reflectors 54, there are arranged third substrates 58 which are formed long in the vehicle width direction. Nine light sources 57 for the tail lamp are provided on each of the third substrates 58 formed left and right in pairs. In addition, three places located at spaced intervals in the longitudinal direction of each of the third substrates 58 are fastened to third bosses 59 through screw members 60.

By the way, a lower wall portion of the stop lamp reflector 45, namely, the second lateral wall portion 45d is formed with a horizontal portion 45da which is located in the center portion in the vehicle width direction in such a manner as to extend horizontally, and is formed with inclined portions 45db, 45db which are connected continuously to both end portions in the vehicle width direction of the central horizontal portion 45da and which are inclined gradually upwardly and outwardly in the vehicle width direction. On the other hand, each of upper lateral wall portions of the blinker reflectors 54, namely, the third lateral wall portion 54d is formed with an inclined portion 54da which is inclined in parallel with the inclined portion 45db of the second lateral wall portion 45d, and a horizontal portion 54db which extends horizontally in the vehicle width direction from an outer end portion in the vehicle width direction of the inclined portion 54da.

Further, the housing 38 has a wall portion 61 which projects and extends horizontally in the vehicle width direction, below the horizontal portion 45da of the second lateral wall portion 45d of the stop lamp reflector 45. The third substrate 58, in a front view, is located below the horizontal portion 45da and the inclined portion 45db of the second lateral wall portion 45d and above the wall portion 61 and the inclined portion 54da of the third lateral wall portion 54d, in such a manner as to be sandwiched in between in the upward and downward direction.

Moreover, tail lamp reflection surfaces 62, 63 for reflecting the light from the light sources 57 for the tail lamp 37 are formed on outer surfaces of the stop lamp reflector 45 and the blinker reflector 54. In this embodiment, the tail lamp reflection surface 62 is formed on an outer surface of the second lateral wall portion 45d of the stop lamp reflector 45, while the tail lamp reflection surface 63 is formed on an outer surface of the third lateral wall portion 54d of the blinker reflector 54. In addition, a tail lamp reflection surface 64 is formed also on an upper surface of the wall portion 61.

Further, portions facing at least the light sources 57 for the tail lamp 37, in the outer surfaces of the stop lamp reflector 45 and the blinker reflector 54, namely, the second lateral wall portion 45d and the third lateral wall portion 54d in this embodiment are formed in the shape of a flat plate extending in parallel with optical axes of the light sources 57 for the tail lamp 37.

The tail lamp 37 has an inner lens 65 for the tail lamp 37, which is located in the rear of the light sources 57 for the tail lamp 37. This inner lens 65 for the tail lamp 37 is made of frosted glass and has substantially a U-shaped cross section opened in the forward direction. The inner lens 65 for the tail lamp 37 is fastened to the stop lamp reflector 45 by a plurality of screw members 66. In addition, the inner lens 65 for the tail lamp 37 is colored red.

By the way, since no reflector is arranged above the third substrate 58 in a position located outwardly in the vehicle width direction of the stop lamp reflector 45, each outer surface of the left and right end portions of the outer lens 39 is coated with paint for preventing the penetration of light in such a manner that the light from the light sources 57 for the tail lamp 37 provided in the third substrate 58 in a position located outwardly in the vehicle width direction of the stop lamp reflector 45 is prevented from coming out upwardly. In addition, an area to be coated with paint is an area designated by W in FIG. 5, and no paint is coated on an area located above the inner lens 65 for the tail lamp 37 in the outer surfaces on both left and right end portions of the outer lens 39, in order to increase light distribution to the rear upper part.

Next, the operation of this embodiment will be explained.

Attached to the housing 38 separately from each other are the stop lamp reflector 45 for reflecting through the inner surface thereof the light from the light sources 41 for the stop lamp 35, and the pair of left and right blinker reflectors 54 for reflecting through each of the inner surfaces thereof the light from the light sources 48 for the blinkers 36. The light sources 57 for the tail lamp 37 are located between the stop lamp reflector 45 and the blinker reflectors 54. The tail lamp reflection surfaces 62, 63 for reflecting the light from the light sources 57 for the tail lamp 37 are formed on the outer surfaces of the stop lamp reflector 45 and the blinker reflectors 54. With the above construction, the reflector for the tail lamp 37 use only is not necessary and thus the number of component parts can be reduced and the tail light device 33 can be made smaller in size.

Further, at least portions of the outer surfaces of the stop lamp reflector 45 and the blinker reflector 54, which face the light sources 57 for the tail lamp 37, namely, the second lateral wall portion 45d of the stop lamp reflector 45 and the third lateral wall portion 54d of the blinker reflector 54 in this embodiment, are formed in a flat shape extending in parallel with the optical axes of the light sources 57 for the tail lamp 37. Accordingly, the tail lamp reflection surfaces 62, 63 also extend in parallel with the optical axes of the light sources 57 for the tail lamp 37, so that the light from the light sources 57 for the tail lamp 37 can be more easily irradiated to the rear side.

Further, the stop lamp reflector 45 has the concave surface portions 45a, 45b which are each arranged on the near sides to the light sources 41 for the stop lamp 35 corresponding to the stop lamp reflector 45, and the pair of upper and lower lateral wall portions 45c, 45d which extend rearwardly in the irradiating direction from the concave surface portions 45a, 45b, while the blinker reflector 54 has the concave surface portions 54a, 54b, 54c which are each arranged on the near sides to the light sources 48 for the blinkers 36 corresponding to the blinker reflector 54 and the pair of upper and lower lateral wall portions 54d, 54e which extend rearwardly in the irradiating direction from the concave surface portions 54a, 54b, 54c. The light sources 57 for the tail lamp 37 are located forwardly of the boundaries 45e, 54f facing the light sources 57 of the tail lamp 37, among the boundaries between the concave surface portions 45a, 45b; 54a, 54b, 54c and the lateral wall portions 45c, 45d; 54d, 54e. Namely, the light sources 57 for the tail lamp 37 are located forwardly of the boundary 45e of the stop lamp reflector 45 and forwardly of the boundary 54f of the blinker reflector 54 in this embodiment. With the above construction, the light sources 57 for the tail lamp 37 are arranged in a comparatively large space around the perimeter of the concave surface portions 54a, 54b, 54c, so that it is possible to increase the degree of freedom with respect to the arrangement of the light sources 57 for the tail lamp 37.

Furthermore, since the inner lens 65 for the tail lamp 37 is made of frosted glass and arranged to the rear of the light sources 57 for the tail lamp 37, the tail lamp 37, in cooperation with the reflecting light from the tail lamp reflection surfaces 62, 63 of flat shape formed on outer surfaces of the stop lamp reflector 45 and the blinker reflector 54, can easily cause surface light emission.

While a preferred embodiment of the present invention has been described, the present invention is not limited to the above described embodiment, and various changes and modifications may be made without departing from the spirit and scope of the present invention.

We claim:

1. A tail light device for a vehicle, comprising:
   a stop lamp, a blinker and a tail lamp disposed in a common housing,
   a stop lamp reflector which is concave and reflects light from a light source for said stop lamp, the light being reflected through a concave inner surface of said stop lamp reflector, the stop lamp reflector surrounding said light source for said stop lamp, and
   a blinker reflector which is concave and reflects light from a light source for said blinker, the light being reflected through a concave inner surface of said blinker reflector, the blinker reflector surrounding said light source for said blinker,
   a light source for said tail lamp, disposed between said stop lamp reflector and said blinker reflector, and
   tail lamp reflection surfaces for reflecting light from said light source for said tail lamp, said tail lamp reflection surfaces being outer surfaces of said stop lamp reflector and said blinker reflector,
   wherein said stop lamp reflector and said blinker reflector are each attached to said common housing separately from each other, and
   wherein said tail light device does not include a tail lamp reflector for the tail lamp use only, and wherein said light source for said tail lamp is disposed between said light source for said stop lamp and said light source for said blinker, in a direction opposite to a direction of the projection of an optical axis of the light source for said stop lamp.

2. The tail light device according to claim 1, wherein at least a portion of each of said outer surfaces of said stop lamp reflector and said blinker reflector which faces said light source for said tail lamp has a flat shape and extends in parallel with an optical axis of said light source for said tail lamp.

3. The tail light device according to claim 2,
   wherein said stop lamp reflector is disposed adjacent to said light source for said stop lamp,
   wherein said blinker reflector is disposed adjacent to said light source for the blinker,
   wherein each of said stop lamp reflector and said blinker reflector comprise concave surface portions which are configured to reflect light rearwardly,
   wherein each of said stop lamp reflector and said blinker reflector comprises a pair of lateral wall portions extending rearwardly, in a light irradiating direction, from said concave surface portions, and
   wherein among all boundaries between said concave surface portions and said lateral wall portions, said light source for said tail lamp is disposed forwardly of a boundary facing said light source of said tail lamp.

4. The tail light device according to claim 2, further comprising an inner lens for said tail lamp, said inner lens being made of frosted glass and being disposed rearward of said light source for said tail lamp.

5. The tail light device according to claim 3, further comprising an inner lens for said tail lamp, said inner lens being made of frosted glass and being disposed rearward of said light source for said tail lamp.

6. The tail light device according to claim 1, wherein said light source for said tail lamp is disposed forwardly of said light source for said stop lamp, in the direction opposite to the direction of the projection of the optical axis of the light source for said stop lamp.

7. The tail light device according to claim 1,
wherein said light source for said stop lamp is disposed on a first substrate,
wherein said light source for said blinker is disposed on a second substrate, and
wherein said light source for said tail lamp is disposed on a third substrate.

8. The tail light device according to claim 7, wherein said third substrate extends in a vehicle width direction from a position which vertically overlaps with only the first substrate to a position which vertically overlaps with only the second substrate.

9. The tail light device according to claim 7, wherein said third substrate extends in a vehicle width direction from a position which vertically overlaps with only the first substrate to a position which vertically overlaps with only the second substrate, via a position which vertically overlaps with both the first substrate and the second substrate.

10. The tail light device according to claim 7, wherein said third substrate is disposed forwardly of said first substrate, in the direction opposite to the direction of the projection of the optical axis of the light source for said stop lamp.

11. The tail light device according to claim 7, wherein said third substrate is disposed between said first substrate and said second substrate, in the direction opposite to the direction of the projection of the optical axis of the light source for said stop lamp.

\* \* \* \* \*